(12) United States Patent
Dowben et al.

(10) Patent No.: US 6,771,730 B1
(45) Date of Patent: Aug. 3, 2004

(54) BORON-CARBIDE SOLID STATE NEUTRON DETECTOR AND METHOD OF USING THE SAME

(75) Inventors: Peter A. Dowben, Crete, NE (US); Shireen Adenwalla, Lincoln, NE (US); Brian W. Robertson, Lincoln, NE (US); Mengjun Bai, Lincoln, NE (US)

(73) Assignee: Board of Regents of University of Nebraska, Lincoln, NE (US)

( * ) Notice: Subject to any disclaimer, the term of this patent is extended or adjusted under 35 U.S.C. 154(b) by 0 days.

(21) Appl. No.: 09/856,966
(22) PCT Filed: Nov. 24, 1999
(86) PCT No.: PCT/US99/28038
§ 371 (c)(1), (2), (4) Date: Sep. 6, 2001
(87) PCT Pub. No.: WO00/33106
PCT Pub. Date: Jun. 8, 2000

Related U.S. Application Data (60) Provisional application No. 60/109,898, filed on Nov. 25, 1998.

(51) Int. Cl.$^7$ ................................................ G01T 3/00
(52) U.S. Cl. .................... 376/155; 376/153; 250/390.01
(58) Field of Search ................. 376/155, 153; 250/390.01, 370; 438/56

(56) References Cited

U.S. PATENT DOCUMENTS

| | | |
|---|---|---|
| 2,867,727 A | 1/1959 | Welker et al. |
| 3,227,876 A * | 1/1966 | Ross .................... 250/83.1 |
| 4,957,773 A | 9/1990 | Spender et al. |
| 4,980,198 A | 12/1990 | Dowben et al. |
| 5,164,805 A | 11/1992 | Lee |
| 5,216,249 A | 6/1993 | Jones et al. |
| 5,399,863 A * | 3/1995 | Carron et al. .......... 250/370.05 |
| 5,468,978 A | 11/1995 | Dowben |
| 5,632,669 A | 5/1997 | Azarian et al. |
| 5,658,834 A | 8/1997 | Dowben |
| 5,707,879 A * | 1/1998 | Reinitz .......................... 437/3 |
| 5,750,231 A | 5/1998 | Ahlert et al. |
| 5,940,460 A * | 8/1999 | Seidel et al. ................. 376/153 |
| 6,025,611 A * | 2/2000 | Dowben ....................... 257/183 |
| 6,077,617 A | 6/2000 | Dowben et al. |
| 6,440,786 B1 | 8/2002 | Dowben |

FOREIGN PATENT DOCUMENTS

| | | | |
|---|---|---|---|
| JP | 360152069 A | | 8/1985 |
| JP | 61-035384 | * | 2/1986 |
| JP | 61-035385 | * | 2/1986 |
| JP | 61-152084 | * | 7/1986 |

OTHER PUBLICATIONS

T. Kamijoh, and K. Kuriyama, J., Appl. Phys. 51, 1827 (1980).
C.J. Smith and C.W. Low, J. Appl. Phys. 66, 5102 (1989).
R. Bacewicz and T.F. Ciszelk, Appl.Phys. Lett. 52, 1150 (1988).
A. Mireshghi et al., IEEE Trans. Nucl. Sci. 39, 635 (1992).
A. Mireshghi et al., IEEE Trans. Nucl. Sci. 41, 915 (1992).

(List continued on next page.)

*Primary Examiner*—Michael J. Carone
*Assistant Examiner*—Rick Palabrica
(74) *Attorney, Agent, or Firm*—Shook, Hardy & Bacon, LLP (57) ABSTRACT

A boron carbide solid state neutron detector and method of using the detector is disclosed, wherein the detector includes a layer of boron carbide wherein the boron carbide layer is an electrically active part of the detection device, a sensing mechanism inherent to said boron carbide layer, wherein the sensing mechanism detects changes in the boron carbide layer caused by the interception of neutrons and a monitoring device coupled to the sensing mechanics.

21 Claims, 6 Drawing Sheets

OTHER PUBLICATIONS

D.S. McGregory et al., Nucl. Instr. and Meth. in Phy. Res. A381, 498–501 (1996).

J. Mazurowski et al., "Characterization of Boron Carbide Films Formed by PECVD," Wide Bandgap Semiconductors, Mat. Res. Soc. Symp. Proc. 242 (1992) 637–642.

Sunwoo Lee et al., "Characterization of Boron Carbide Thin Films Fabricated by PECVD from Boranes," Journ. Appl. Phys. 72 (1992) 4925–V4933.

Sunwoo Lee et al., "Conductance in Microcrystalline $B_{1-x}C_x$/Si Heterojunction Diodes," Mat. Res. Soc. Symp. Proc. 283 (1993) 483–V488.

Sunwoo Lee and P.A. Dowben, "The Properties of Boron Carbide/Silicon Heterojunction Diodes Fabricated by Plasma–VEnhanced Chemical Vapor Deposition," Appl. Phys. A 58 (1994) 223–227.

Dongjin Byun et al., "Heterojunction Fabrication by Selective Area Chemical Vapor Deposition Induced by Synchrotron Radiation," Appl. Phys. Lett. 64 (1994) 1968–1970.

J.M. Carpinelli et al., "An STM Study of Molecular Intermediates in the Dissociative Adsorption of closo–1,2dicarbadodecaborane on Si(111)," J. Vac. Sci. Technol. B13 (1995) 1203–1206.

Dongjin Byun et al., "Comparison of Different Chemical Vapor Deposition Methodologies for the Fabrication of Heterojunction Boron–Carbide Diodes," NanoStructured Materials 5 (1995) 465–473.

Ahmad A. Amad et al., "Sputter Deposition of High Resitivity Boron Carbide," Thin Solid Films (1998) in press.

Seong–Don Hwang et al., "Fabrication of n–tupe Nickel Doped $B_5C_{1+8}$ Homojunction and Heterojunction Diodes," Appl. Phys. Lett. 70 (1997) 1028.

Seong–Don Hwang et al., "Fabrication of Boron Carbide—Boron Heterojunction Devices," Appl. Phys. Lett. 68 (1996) 1495–1497.

Seong–Don Hwang et al., "Nickel Doping of Boron Carbide Grown by Plasma Enhanced Chemical Vapor Deposition," J. Vac. Sci. Technol. B14 (1996) 2957–2960.

Seong–Don Hwang et al., "Nickel Doping of Boron Carbide and Fermi Level Shifts," J. Vac. Sci. Technol. A15 (1997) 854.

J.C. Lund et al., "Boron Phosphide on Silicon for Radiation Detectors," MRS Symposium Proceedings vol. 162 (1990) 601.

Y. Kumashiro et al., "Thermal Neutron Irradiation Experiments on $^{10}$BP single–crystal wafers," J. Less–Common Metals 143 (1988) 71.

Yu A. Bykovskii et al., Tech. Phys. Lett. 19, 457 (1993).

H. Kitaguchi et al., IEEE Trans. Nucl. Sci. 43, 1846 (1996).

D.S. McGregor et al., IEEE Trans. Nucl. Sci. 43, 1357 (1996).

Seong–Don Hwang et al., "Phosphorus Doping of Boron Alloys," in: *Advances in Microcrystalline and Nanocrystalline Semiconductors*, MRS Symposium Proceedings 452 (1997) 1031–1036.

D.N. McIlroy et al., "The Incorporation of Nickel and Phosphorus Dopants into Boron Carbon Alloy Thin Films," Appl. Phys. A66 (1998).

S. Adenwalla et al., "A New Class of Boron Based Solid State Neutron Detectors," Aug. 11, 1998.

A. Tavendale, "Semiconductor Nuclear Radiation Detectors," 17 Am. Rev., Nucl. Sci. 73, 73–96 (1967).

Y. Kumashiro et al., "Thermal Neutron Irradiation Experiments on $^{10}$BP Single–Crystal Wafers," 143 Journal of the Less–Common Metals 71, 71–75 (1988), J.C. Lund et al., "Boron Phosphide on Silicon for Radiation Detectors," 162 Mat. Res. Soc. Symp. Proc. 601, 601–604 (1990).

A. Mireshghi et a., "Amorphous Silicon Position Sensitive Neutron Detector," 39 IEEE Transactions on Nuclear Science 635, 635–640 (1992).

Y. Bykovskii et al., "neutron Fluence Sensor Based Boron Carbide," Tech. Phys. Lett., Jul. 1993.

A. Mireshghi et al., "High efficiency Neutron Sensitive Amorphous Silicon Pixel Detectors," 41 IEEE Trans. on Nuc. Sci. 915, 915–921 (1994).

D.S. McGregory et al., "Semi–insulating Bulk GaAs Thermal Neutron Imaging Arrays," 43 IEEE Trans. on Nucl. Sci. 1357, 1357–1364 (1996).

H. Kitaguchi et al. "Silicon Semiconductor Detectors for Various Nuclear Radiation," 43 IEEE Trans. on Nucl. Sci. 1846, 1846–1850 (1996).

"The Neutron Materials Program at MURR," pp. 1–2 (Mar. 1996) <http://www.missouri.edu/~murrwww/neutmat.html.>.

"More About MURR's Neutron Materials Science Program," pp. 1–2 (Apr. 1996) <http.//www.missouri.edu/~murrwww/neutmat1.html>.

B.J. Van Zeghbroeck, "Semiconductor Fundamentals, Introduction, Structure and Principle of Operation," 12 pages (1997), <http://ece–www.colorado.edu/~bart/book.html>.

B.W. Robertson et al., A Class of Boron–Rich Solid–State Neutron Detectors, May 13, 2002, pp. 3644–3646, Applied Physics Letter, vol. 80, No. 19.

Synchrotron Radiation Center Annual Report, 1991, pp. 30–31, Synchrotron Radiation News.

Diode Fabricated by Synchrotron Processing, Fall 1994, p. 6, Aladdin.

Robert Sheldon, Physicist Improves Method for Making Semiconductors, Nov. 9, 1994, University of Nebraska–Lincoln News and Information.

D. Buchenauer, et al., Boron–Based Films for Solid–State Neutron Sensors, Mar. 11–12, 1997, Fifth Scientific Symposium on Room–Temperature Semi–Conductor X–Ray, Gamma–Ray, and Neutron Detectors.

Monica Norby, Tiny Neutron Detector Developed, Aug. 22, 2002, pp. 1, 5, Scarlet.

New Type of Thermal–Neutron Detector with High Sensitivity and High Speed Response, Aug. 4, 2002, pp. 1–2.

EJ–400 Fast Neutron Detector, Aug. 4, 2002, p. 1.

Compact Neutron Detector Pulse Counting Modules, Precision Data Technology, Inc., Aug. 4, 2002, p. 1.

Lightweight Land Mine Detector, Office of Science, U.S. Department of Energy, Aug. 4, 2002, p. 1.

FHT 750, Biorem Neutron Detector, Thermo Eberline ESM, Aug. 4, 2002, p. 1.

Hand–Held Gamma–Neutron Detector, Laurus Systems Inc., undated.

C.S. Silver et al., Optimization of a LiF Bolometric Neutron Detector, Jun. 24, 2001, pp. 1–17.

Zane W. Bell et al., Neutron and Photon Detectors for Uranium and Plutonium Applications, undated, pp. 1–9.

S. Adenwalla, et al., Boron Carbide/n–Silicon Carbide Heterojunction Diodes, Dec. 24, 2001, pp. 4357–4359, Applied Physics Letters, vol. 79, No. 26.

The Neutron Detector, Aug. 4, 2002, p. 1.

B.W. Robertson, et al., Draft white paper to NA–22 on Initial Processing and Efficiency Enhancement for Semiconducting B–C Neutron Detectors, undated, pp. 1–3.

Martha Stoddard, Tiny Neutron Detector has Security Applications, Lincoln Journal Star, Jul. 27, 2002, pp. 1 and 2A.

Michael O'Connor, UNL Device Seen as Security Boon, Omaha World–Herald, Jul. 27, 2002.

The Power of Creativity, Omaha World–Herald, Jul. 31, 2002.

U.S. Develops Neutron to Sniff Out Nuclear Material, Economic Times of India, Jul. 22, 2002.

* cited by examiner-

BORON-CARBIDE SOLID STATE NEUTRON DETECTOR AND METHOD OF USING THE SAME

CROSS REFERENCE TO RELATED APPLICATIONS

This application was filed under 35 U.S.C. § 371 based upon PCT Application Number PCT/US99/28038, filed on Nov. 24, 1999 which takes priority from U.S. Provisional Application No. 60/109,898, filed on Nov. 25, 1998.

STATEMENT REGARDING FEDERALLY SPONSORED RESEARCH OR DEVELOPMENT

The Board of Regents of the University of Nebraska acknowledges that some funding for the research leg to this application was provided by the United States Government.

BACKGROUND OF THE INVENTION

The present invention relates to detection of neutrons More specifically, the present invention relates to a method and device for the efficient detection of neutrons that employs a boron-rich semiconductor as an electrically active part of the detection device.

Neutron scatting is an important research method to determine the structure of solids and liquids. It is used to understand the forces that act between the atoms in these systems and to determine the magnetic behavior of materials as well. The research and practical applications cover a broad range of areas, from the basic properties of materials to studies of engineering and medical applications.

There are essentially only four elements suitable for forming solid state semiconductor neutron detectors—boron (B), cadmium (Cd), gadolinium (Gd) and lithium (Li). Lithium semiconductor materials exist ($LiInS_2$, $LiInSe_2$ and LiZnP) but are difficult to reliably fabricate into devices and are very difficult materials with which to work Gadolinium conversion layer based silicon (Si) diodes have been fabricated and proposed for neutron detection, but are not particularly stable. Cadmium zinc telluride has been shown to yield thermal neutron detection and the cadmium neutron capture cross section is high, but the neutron capture produces such high energy gamma rays (over 0.5 MeV) that the detectors would have to be large in order to detect these gammas efficiently.

Use of boron with neutron detectors is known both in the scintillator, the gas and the conversion layer varieties. Boron phosphide (BP) heterojunction diodes with silicon were successfully tested as alpha radiation detectors, but failed to work as neutron detectors. Boron carbide ($B_4C$) was successfully used as a neutron detector based upon resistivity changes resulting from increased lithium doping, as were (111) BP wafers. The lithium production in the boron carbide was a result of the following nuclear reactions:

Boron has also been considered as a coating to a silicon diode and a GaAs diode but the maximum efficiency is low (less than 5%).

Existing gas and liquid neutron detectors are much larger and less rugged than solid-state ones could be. However, existing solid state neutron detectors also suffer serious limitations. For example, known boron doped semiconductors are only a few percent efficient because they contain relatively little boron. Gadolinium, lithium and hydrocarbon conversion layers are all adversely affected by corrosion and high temperatures.

Furthermore, known conversion layer devices have low efficiencies, unless multiply stacked, because the range of the reaction products in the material of the conversion layer is generally considerably less than the thickness required for stopping thermal neutrons. Gadolinium conversion layers are an exception—but the neutron—gadolinium reaction results in conversion electrons of relatively low energy (70 keV) compared with the reaction products in the case of neutron capture by boron 10. Cadmium zinc telluride has been shown to yield thermal neutron detection, but the neutron capture produces such high energy gamma rays (over 0.5 MeV) that the detectors must be large to detect these gammas efficiently. Scintillator combinations with photomultipliers or intensified cameras are bulky and heavy and, except for neutron-detecting scintillating fibers coupled optically to a remote photomultiplier or camera, are intolerant of high temperatures.

Boron and boron compounds, including boron carbide, are also used in neutron absorbing shielding purposes in nuclear reactors and other types of neutron radiation environments. For example, boron carbide can be used with shielding, thermal electric power, or detection of neutrons (by means of the resistivity change not by detection of individual neutrons). However, use of boron carbide to detect neutrons where the boron carbide is an electrically active semiconductor is novel.

SUMMARY OF THE INVENTION

It is an object of the present invention to provide an inexpensive solid state neutron detector that includes a robust, structurally forgiving boron rich semiconductor.

It is another object of the present invention to provide a boron carbide semiconductor that utilizes its electrical properties as a semiconductor rather than its electrical property of resistance as a means of detecting neutrons or its thermoelectric properties in detecting neutrons.

A still further object of the present invention is to provide a detection device that yields high gain.

A further object of the present invention is to provide a detection device that provides real time response.

A further object of the present invention is to provide a detection device that is capable of detecting single neutrons.

Yet another object of the present invention is to provide a detection device that has low sensitivity to gamma and other radiation.

Still another object of the present invention is to provide a method of detecting neutrons with a detector device having a boron carbide semiconductor.

According to the present invention, the foregoing and other objects are obtained by a detection device having a layer of boron carbide. In the device, the boron carbide layer is an electrically active part of the detection device. The sensing mechanism of the detection device is inherent in the electrically connected, semiconducting boron carbide layer, which provides neutron capture resulting in prompt, innately highly amplified, electrical output signals following interception of neutron(s).

Additional objects, advantages, and novel features of the invention will be set forth in part in the description which follows, and in part will become apparent to those skilled in the practice of the invention. The objects and advantages of the invention ray be realized and attained by means of the forms of instrument and the combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views.

DETAILED DESCRIPTION OF THE INVENTION

Figure 1:
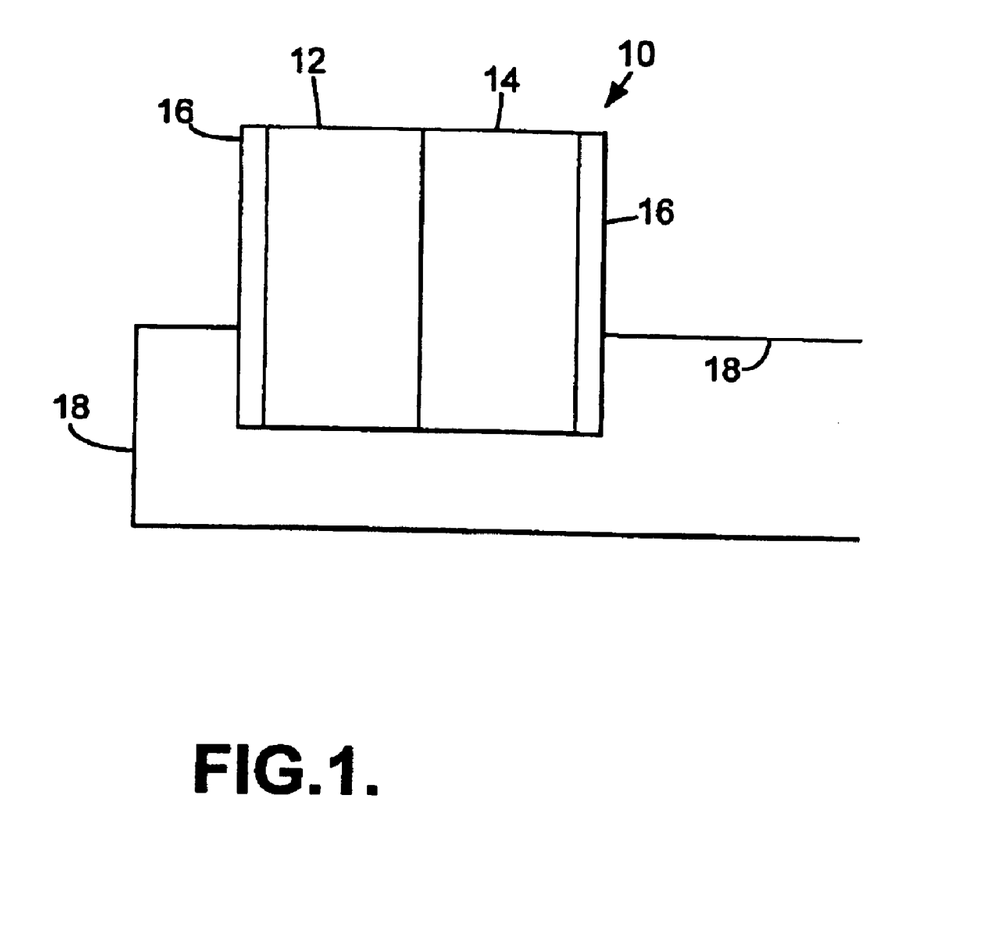
FIG. 1 is a schematic representation of a heterojunction diode embodying the present invention.

Referring initially to FIG. 1, a heterojunction diode 10 is shown. This invention also applies to homojunction diodes and other known semiconductor detection devices, examples of which are provided below. Diode 10 is shown as having a boron carbide boron-carbon alloy semiconductor 12 on a silicon substrate 14. Semiconductor 12 is grown by plasma-enhanced chemical vapor deposition (PECVD). The preferred deposition technique is disclosed in U.S. Pat. Nos. 4,957,773 (Spenser, et al.); 5,468,978 (Dowben); 5,658,834 (Dowben), which patents are expressly incorporated by reference herein A pair of sputter-deposited gold electrodes 16 communicate with semiconductor 12 and substrate 14. Secured to each electrode 16 is a wire 18 that serves to connect electrodes 16 to a bias voltage source and an electrical detection device such as a charge pulse measurement circuit. The sensory/measurement devices as well as monitoring devices are known and will not be discussed further.

Essentially, the invention works by including a boron-rich carbon alloy as an electrically active semiconductor region of a detector and by placing the detector where it can receive neutrons. The preferred way to detect neutrons is with atoms which are the most likely to capture neutrons and in which each neutron capture leads to the creation of one or more energetic charged particles whose mass is large compared with that of an electron and whose energy is large and can efficiently be converted to a measurable electrical signal. Boron atoms are highly likely to capture neutrons and such neutron capture creates highly energetic ions.

The following two reactions between boron isotope 10 ($^{10}$B) and a thermal neutron form the basis for neutron detection as contemplated by the present invention:

With a boron-rich semiconductor, the boron captures the neutron and promptly decays into high-energy ions. The energetic ions cause secondary ionization of orders of magnitude more atoms in the surrounding materials for each captured neutron, liberating a correspondingly large electrical charge. The diode nature of the device enables the electrical charge to be collected. Also, incorporating the boron-rich alloy as an electrically active semiconductor part of the detector allows for the overall thickness of the device to be reduced while retaining high efficiency of neutron detection.

Figure 2:
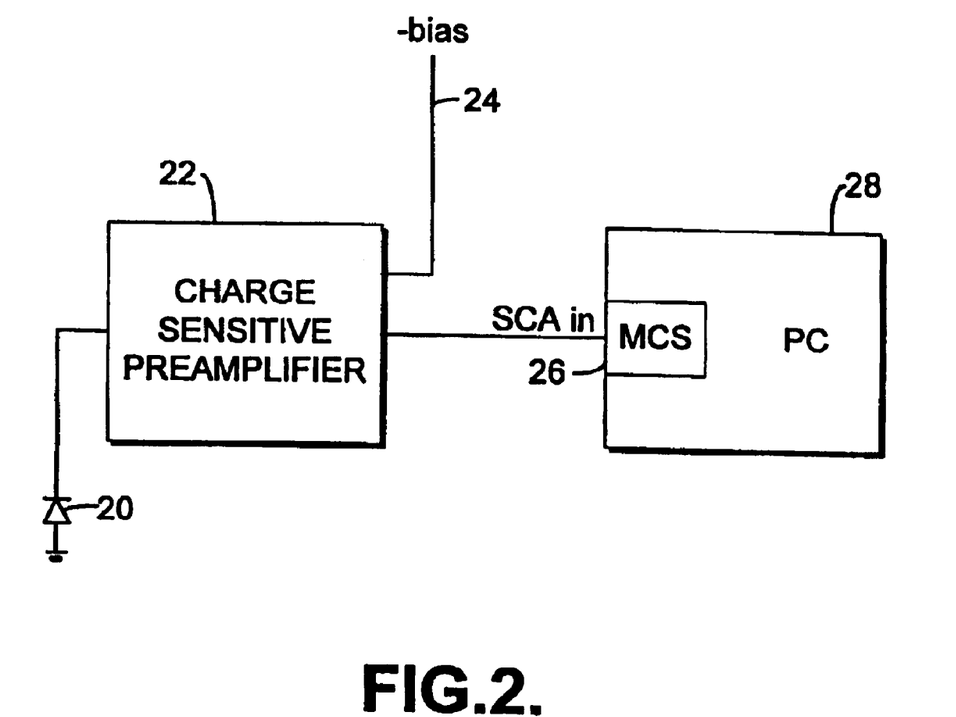
FIG. 2 is a schematic representation of the test device using the principles of the present invention.

The first device to use this concept was a boron-carbon alloy semiconductor (grown by plasma-enhanced chemical vapor deposition) on a silicon substrate with sputter-deposited gold electrodes, as shown in FIG. 2. As seen in FIG. 2, a boron carbide/silicon diode 20 is connected to a charge sensitive preamplifier 22. Charge sensitive preamplifier 22, in turn, is connected to a bias voltage input 24 and a single channel analyzer/multichannel scaler 26 which is connected to a computer 28.

In this heterojunction diode, the above reactions lead to dense local ionization of atoms and hence production of electron-hole pairs (at least of order $5\times10^5$ pairs per neutron reaction), many of which are collected due to the applied bias voltage and form a charge pulse which is registered and counted by external circuitry. Such a device was first tested successfully on Jul. 24, 1998 at the nuclear reactor in the VA Hospital in Omaha, Nebr. This device could be improved in several ways, including $^{10}$B-enrichment (to nearly 100% $^{10}$B from the naturally occurring approximately 19% $^{10}$B found in unenriched boron), increasing the thickness and quality of the boron carbide layer, changes in the electrical configuration and electrical circuitry, and changes in the functional and geometrical configurations.

The deposition of films for the heterojunction diodes (boron-carbon alloy, $B_5C$, on (111) Si) performed in this test was undertaken in a custom designed parallel plate 13.56 (MHz radio-frequency PECVD reactor used in previous studies). The silicon subrates were doped to $7\times10^{14}/cm^3$. The (111) Si substrates surfaces were eared by Ar+ ion sputtering in the plasma reactor. The source molecule gas closo-1,2-dicarbadodecaborane (ortho-cadborane, $C_2B_{10}H_{12}$, was used as the source compound for growing the boron alloy.

Typical $B_5C$/n-type silicon heterojunctiors have been routinely formed by this technique. An example of one such diode device is presented in FIG. 2 with the boron carbide alloy layer of about 1000 nm thick as used as a neutron detector. These devices typically have onsets of 1 eV with very little leakage current (less than 5 μA at 25° C.) and the boron carbide layer has the p-type character of the undoped PECVD semiconducting boron carbide in this device topology.

Figure 4:
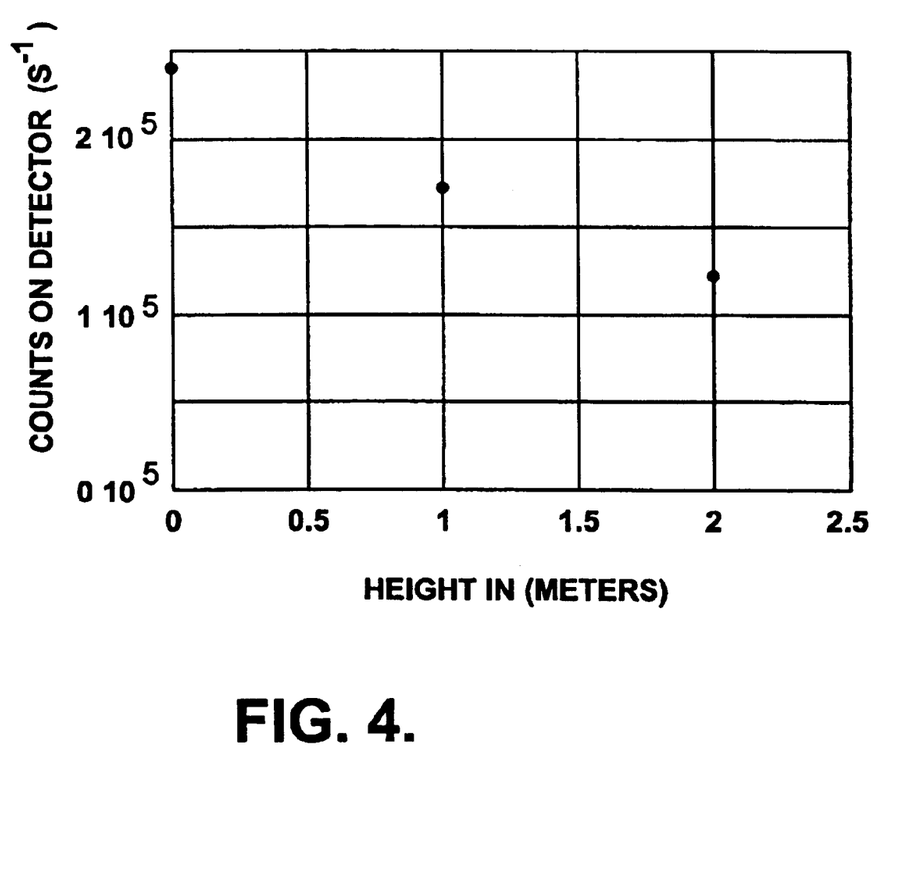
FIG. 4 depicts count rates of neutrons with insertion of heterojunction diodes of the present invention into a neutron reactor.

The detector area of these heterojunction diodes was about 1 cm², and wired in a "mesa" geometry. The neutron source was a small TRIGA-type reactor (V.A. Medical Center, Omaha, Nebr.) with a flux of $1.6\times10^6$ n/cm²·s based on calculations for the fission chamber. A heterojunction diode, reversed biased to about 3 V, was wired for pulse counting as shown in FIG. 2 and inserted into the reactor. The resulting count rates with insertion are plotted in FIG. 4. Background and noise counts are in the range of 250 to 300 Hz, and within the reactor, the count rate rises to $2\times10^5$ Hz.

To assure that very little of this count rate is attributable to gamma radiation, the diode was tested against a 100 mCi $^{137}$Cs source for gamma radiation at a distance of 10 cm. The 661 keV gamma rays provided no detectable increase in count rate above background in spite of an expected $10^6$ gamma rays incident on the diode per second. This is consistent with the expected extremely low gamma-ray sensitivity of such a solid state boron-carbon/silicon semiconductor alloy device, since boron and carbon have low atomic numbers and the boron-rich detectors were made very thin (1000 nm), and the electrically active silicon layer was under 600 nm thick.

Figure 5:
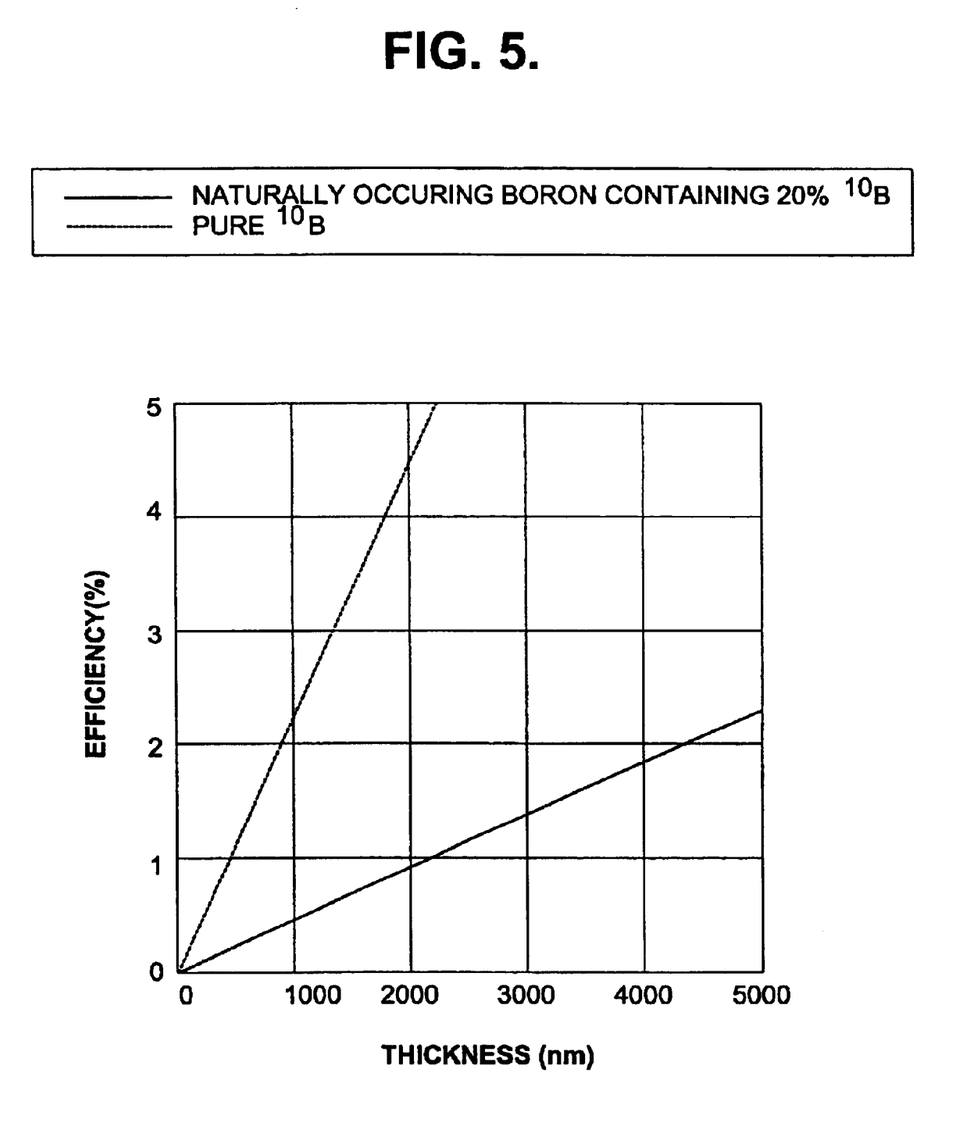
FIGS. 5 and 6 depict the relationship of ideally attainable neutron detection efficiency as a function of the thickness of the boron-carbide layer of heterojunction diodes of the present invention in the cases of natural 10 Boron abundance and 100% 10 Boron enrichment of the boron carbide layer.
Figure 6:
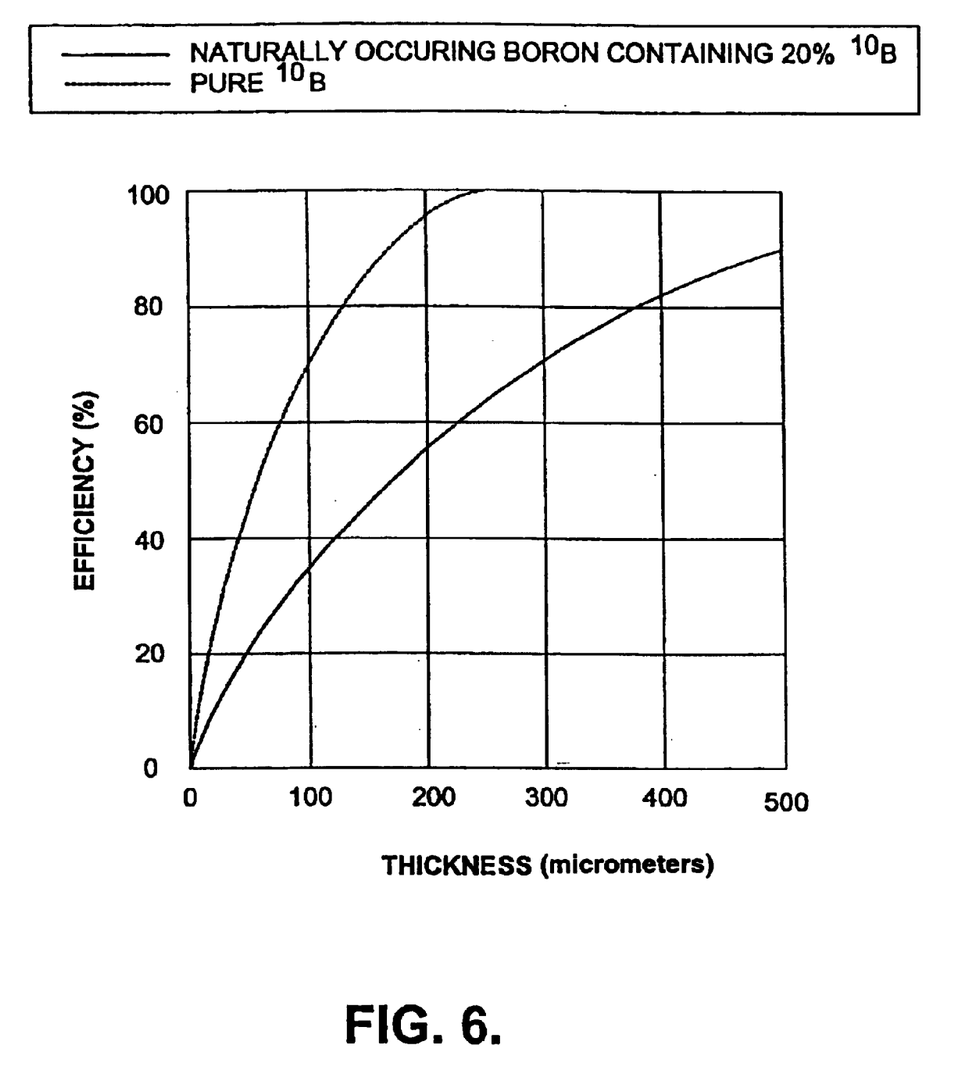

Given that almost all counts are attributable to neutrons and that the boron carbide film is about 1000 nm thick, the detection efficiency is thus about 1% as best seen in FIG. 5. Given that devices can be made with boron carbide of 50 micrometers to 100 micrometers in thickness and with depletion layers extending several micrometers, the single (thermal) neutron detection efficiencies are, conservatively, expected to reach 80% and higher in devices which simultaneously have exceedingly low γ-ray sensitivity (<1% detection efficiency for all energies greater than 100 keV and <0.01% for all energies above 0.5 MeV, assured by the use of boron as the dominant atomic species) as best seen in FIG. 6. Since the neutron—$^{10}$B interaction results almost exclusively in the yield of highly ionizing lithium ions and alpha particles of total kinetic energy about 1.5 MeV and the boron atoms form the major species in the active semiconducting regions of the devices, the boron-carbon alloy layer of the detector yields an enormous internal gain (considerably greater than $10^5$) which is essentially noise-free and comparable with the gain of the intensifiers and photomultipliers commonly used in scintillation-based detectors and imagers. By using exclusively $^{10}$B enriched boranes in the PECVD fabrication process, detection efficiency with thinner films can be considerably improved compared with devices whose $^{10}$B content reflects the natural isotopic abundance, about 19% $^{10}$B.

As seen in FIG. 2, the electronics demands are minimal compared with those for gadolinium neutron conversion layer-based detectors (which rely on the much smaller 70 keV energetically available for signal generation by the conversion electrons from gadolinium), while ensuring considerably greater efficiency and stability. Additionally, the boron-carbon devices can be thinner than 100 μm thick and still achieve nearly 100% thermal neutron detective efficiency. Stacking diodes, interleaved with neutron energy absorbers, to form efficient neutron "calorimeters" or spectrometers is also possible. In combination with boron carbide based high temperature electronics, the boron-carbon based neutron detection systems are expected to be particularly applicable in harsh environments because of the refractory and mechanical performance of boron carbide. The boron-carbon devices may even be fabricated on metal substrates as well as fabricated with spatial resolution that could be on scales smaller than 0.5 nm. There is the possibility of fabricating spatial array detectors, including position sensors for scattering experiments, as well.

High efficiency is achieved because there is a proportionally large amount of boron present in the semiconductor layer. The boron carbide semiconductor has boron of whatever isotope one therefore chooses present in atomic fractions in the order of 80%. This is exceedingly rich in boron compared with any other suitable semiconductor. Because the density of boron atoms in the material is so high, the boron-rich layer can be quite thin and still contain enough boron atoms per unit area to be able to detect the neutrons very efficiently. In naturally occurring boron there is close to 20% of the boron atoms which are $^{10}$B atoms which are the isotopes which interact strongly with neutrons to give the reactions provided above. It is certainly possible to increase the fraction of boron that is $^{10}$B from natural abundance to about 95% or higher. This enrichment would result in $^{10}$B atoms accounting for a fraction, about 80% or higher, of all atoms in the semiconductor boron carbide layer. Hence, if material enriched in $^{10}$B is used rather than just the naturally occurring isotope ratio of $^{10}$B, the efficiency increases even further.

Another important issue for efficiency is not just the reaction of the neutron with boron, but the ability to detect the reaction. By incorporating the boron atoms in an electrically active semiconductor where the lithium ion and the alpha particle can cause dense ionization of other atoms, many electron-hole pairs can be created by ionization of the atoms, and the electric fields that can be applied across the boron carbide layer can sweep out a large fraction of the electron-hole pairs. Thus, there are three aspects to efficiency. The first is $^{10}$B being present in large number density. The second being that the reaction of $^{10}$B with neutrons results in ions which very efficiently ionize atoms in the surrounding in an electrically active semiconductor where the charge can be swept out efficiently. The third aspect of efficiency is that $^{10}$B results in ions which have such a large energy that they can produce very large numbers of detectable electron hole pairs. The reactions which occur between neutrons and the other elements which give probable neutron interaction don't result in reaction products which are as readily detectable or detectable to give such large signals. Boron is unique.

Another point concerns detection devices having conversion layers containing boron. Neutron capture by boron generates the alpha particle and the lithium ion which can only travel a very limited distance. If conversion layer contained enough boron atoms to cause capture of a sufficient fraction of neutrons, then the layer will be so thick that the lithium and the alpha particles in some cases will not get out of the boron layer and, therefore, will not generate signals that are readily detectable. This is a severe defect compared with the boron carbide semiconductor devices of the present invention.

Figure 3:
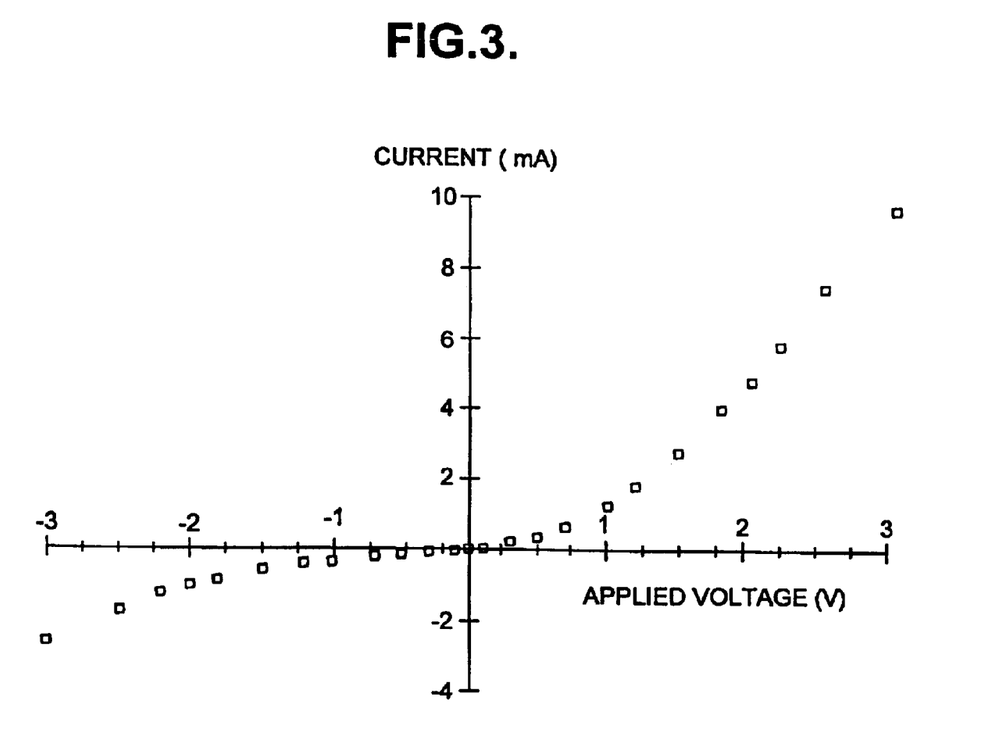
FIG. 3 depicts voltage-current characteristics of heterojunction diodes of the preset invention.

This invention can be used in various forms of solid-state neutron detectors presenting entrance detecting areas of order $\mu m^2$ to $m^2$. These detectors are capable of being implemented with very thin detecting and electrically active regions ($\leq 1$ μm minimum effective electrical thickness), with very low mass per unit detecting area, with efficiencies ranging up to nearly 100% even for single neutrons, with real-time response, with high spatial resolution ($\leq 1$ μm minimum), and with high temporal resolution. Of course, implementation may not always need to, or be able to, employ each of these attributes. As best seen in FIG. 3, voltage and power needs are slight, as are charge pulse processing requirements.

Although the invention is described above as relating to heterojunction diodes, it is to be understood that the invention can be implemented in a large number of other ways, including homojunction diodes; p-i-n diodes; metal-semiconductor-metal, Schottky and other diodes; transistors; diode and transistor arrays; charge-induced devices (CID) and CID arrays; charge-coupled devices (CCD) and CCD arrays; solid-state neutron-detecting analogs of "photomultipliers"; neutron semiconductor avalanche devices; position-sensitive detectors, including those relying on charge subdivision or sensing and on current subdivision and those having capacitive or resistive means of doing so; semiconductor drift detectors or semiconductor drift chambers; stacked series of one or more of the above detector types which are configured to serve as neutron energy spectrometers; individual or stacked series of one or more of the above detector types which also, or alternatively, serve as dosimeters. The dosimeters can be capable of yielding both real-time and cumulative dosimetry information once or many times, completely nondestructively of the dosimetry information contained in the detectors.

The range of applicability of the present invention includes: medical radiation dosimetry; detecting nuclear material; anti-terrorism and anti-smuggling devices; monitoring of nuclear reactors, of nuclear storage units and facilities, and of nuclear weapons, weapons storage and weapons shipment; life science materials and physical sciences scattering experiments; monitoring of neutron sources; calibration of neutron flux; personnel and environmental radiation protection; radiation protection at high energy radiation facilities, including medical x-ray facilities (high energy ones); neutron cancer therapy; profiling of medical, therapeutic, research and other neutron beams; comet, planetary and other space exploration.

From the foregoing, it will be seen that this invention is one well adapted to attain all the ends and objects herein above set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A neutron detection device, said device comprising:
   a sensing mechanism, said sensing mechanism having a layer of boron carbide semiconductor wherein the boron carbide layer is an electrically active part of said detection device; and
   a monitoring device, wherein said monitoring device records changes in said boron carbide layer detected by said sensing mechanism.

2. The device of claim 1, wherein said sensing mechanism is inherent in said boron carbide semiconductor layer and results in a prompt, innately highly amplified, electrical output following capture of a single neutron.

3. The device of claim 2, wherein said device is a homojunction diode.

4. The device of claim 1, further comprising a layer of silicon communicating with said layer of boron carbide.

5. The device of claim 4, wherein said device is a heterojunction diode.

6. The device of claim 1, wherein the thickness of said boron carbide layer is about 1000 nm.

7. The device of claim 5, wherein the thickness of said silicon layer is less than 600 nm.

8. The device of claim 1, further comprising at least two diodes interleaved with a neutron energy absorber.

9. The device of claim 1, wherein said boron carbide layer is fabricated on a metal substrate.

10. The device of claim 1, wherein said boron carbide layer contains at least 80% $^{10}$B.

11. The device of claim 1, wherein said device is capable of operating at 500° C.

12. A method of detecting neutrons, said method comprising:
    positioning a neutron detecting device in a location to allow said device to intercept a stream of neutrons, said neutron detecting device comprising a layer of boron carbide wherein said boron carbide layer is an electrically active part of said device, and a sensing mechanism coupled to said boron carbide layer; introducing at least one neutron traveling in a direction to be intercepted by the boron carbide layer; and monitoring the interaction of the neutron with the boron carbide semiconductor; wherein said sensing mechanism detects changes in said boron carbide layer caused by the interception of neutrons.

13. A method of detecting neutrons, said method comprising:
    positioning a neutron detecting device in a location to allow said device to intercept a stream of neutrons, said neutron detecting device comprising a layer of boron carbide wherein said boron carbide layer is an electrically active part of said device, and a sensing mechanism inherent to said boron carbide layer; introducing at least one neutron traveling in a direction to be intercepted by the boron carbide layer; and monitoring the interaction of the neutron with the boron carbide semiconductor; wherein said sensing mechanism detects changes in said boron carbide layer caused by the interception of neutrons.

14. A neutron detecting device comprising:
    a semiconducting boron carbide layer; and
    a substrate layer coupled with the semiconducting boron carbide layer, wherein the semiconducting boron carbide layer is an electrically active region of the detecting device.

15. The neutron detecting device of claim 14, further comprising:
    at least two electrodes, wherein one electrode is coupled with the semiconducting boron carbide layer, and wherein the other electrode is coupled with the substrate layer.

16. The neutron detecting device of claim 15, further comprising:
    a bias voltage source; and
    an electrical detection device, wherein the bias voltage source and the electrical detection device are coupled with the two electrodes.

17. The neutron detecting device of claim 14, wherein the substrate is formed of silicon.

18. The neutron detecting device of claim 14, wherein the substrate is formed of metal.

19. The neutron detecting device of claim 14, wherein the semiconducting boron carbide layer is p-type.

20. The neutron detecting device of claim 19, wherein the substrate layer is n-type.

21. The neutron detecting device of claim 14, wherein the semiconducting boron carbide layer contains at least 80% $^{10}$B.

* * * * *

UNITED STATES PATENT AND TRADEMARK OFFICE
CERTIFICATE OF CORRECTION

| | | |
|---|---|---|
| PATENT NO. | : 6,771,730 B1 | Page 1 of 1 |
| APPLICATION NO. | : 09/856966 | |
| DATED | : August 3, 2004 | |
| INVENTOR(S) | : Dowben et al. | |

It is certified that error appears in the above-identified patent and that said Letters Patent is hereby corrected as shown below:

Column 1 at line 12 insert the following phrase, --This invention was made with government support under grant F49620-98-1-0463 awarded by the United States Air Force/AFOSR. The government has certain rights in the invention.--

Signed and Sealed this

Twenty-ninth Day of April, 2008

JON W. DUDAS
*Director of the United States Patent and Trademark Office*